United States Patent
Lovejoy

(10) Patent No.: US 10,240,972 B2
(45) Date of Patent: *Mar. 26, 2019

(54) DOPPLER ULTRASONIC VELOCITY PROBE

(71) Applicant: Lovejoy Controls Corporation, Waukesha, WI (US)

(72) Inventor: Kim A. Lovejoy, Waukesha, WI (US)

(73) Assignee: Lovejoy Controls Corporation, Waukesha, WI (US)

( * ) Notice: Subject to any disclaimer, the term of this patent is extended or adjusted under 35 U.S.C. 154(b) by 169 days.

This patent is subject to a terminal disclaimer.

(21) Appl. No.: 15/247,168

(22) Filed: Aug. 25, 2016

(65) Prior Publication Data

US 2017/0038248 A1    Feb. 9, 2017

Related U.S. Application Data

(63) Continuation-in-part of application No. 14/819,131, filed on Aug. 5, 2015.

(51) Int. Cl.
   *G01H 17/00*   (2006.01)
   *G01S 15/58*   (2006.01)

(52) U.S. Cl.
   CPC .......... *G01H 17/00* (2013.01); *G01S 15/586* (2013.01)

(58) Field of Classification Search
   CPC .............................. G01H 17/00; G01S 15/586
   USPC .................................... 73/593, 660, 632, 622
   See application file for complete search history.

(56) References Cited

U.S. PATENT DOCUMENTS

| | | |
|---|---|---|
| 3,325,781 A | 6/1967 | Harris |
| 3,757,565 A | 9/1973 | Wong |
| 4,018,083 A | 4/1977 | Hoffman |
| 4,680,739 A | 7/1987 | Lannuzel |
| 4,884,448 A * | 12/1989 | Ogawa ............... G01P 5/244 600/455 |
| 5,097,708 A | 3/1992 | Kobayashi |
| 5,351,522 A | 10/1994 | Lura |
| 5,394,233 A | 2/1995 | Wang |
| 5,510,781 A | 4/1996 | de Buda |
| 5,838,439 A | 11/1998 | Zang et al. |
| 5,989,191 A | 11/1999 | Scampini |

(Continued)

FOREIGN PATENT DOCUMENTS

| | | |
|---|---|---|
| CN | 202974215 U | 6/2013 |
| KR | 101057030 B1 | 8/2011 |

(Continued)

OTHER PUBLICATIONS

International Search Report pertaining to PCT/US2016/015018, dated Apr. 14, 2016, 8 pages.

(Continued)

*Primary Examiner* — Helen C Kwok
*Assistant Examiner* — Nashmiya S Fayyaz
(74) *Attorney, Agent, or Firm* — Ryan Kromholz & Manion, S.C.

(57) ABSTRACT

A system and method for measuring the vibrations of a test object, such as a machine shaft or other rotating equipment. The system includes a probe sensor fitting having an ultrasonic speaker and an ultrasonic microphone. The probe sensor fitting includes a temperature and relative humidity sensor. The system further includes a probe analyzer circuit with a microcomputer that generates vibration analysis data and probe health diagnostics.

20 Claims, 4 Drawing Sheets

(56) References Cited

U.S. PATENT DOCUMENTS

| | | | |
|---|---|---|---|
| 6,014,896 A | 1/2000 | Schoess | |
| 7,533,572 B2 | 5/2009 | Twerdochlib | |
| 8,296,084 B1 | 10/2012 | Hickling | |
| 8,344,941 B2 | 1/2013 | Peczalski et al. | |
| 8,842,494 B2 * | 9/2014 | Poggiagliolmi | ....... G01V 1/181 |
| | | | 367/94 |
| 2004/0135992 A1 | 7/2004 | Munro | |
| 2008/0234964 A1 | 9/2008 | Miyasaka | |
| 2009/0088902 A1 | 4/2009 | Williams | |
| 2009/0260422 A1 | 10/2009 | Sugiura | |
| 2010/0011868 A1 | 1/2010 | Cox | |
| 2012/0059604 A1 | 3/2012 | Sheu et al. | |
| 2017/0038469 A1 | 2/2017 | Lovejoy | |

FOREIGN PATENT DOCUMENTS

| | | |
|---|---|---|
| WO | WO 96/08700 A1 | 3/1996 |
| WO | WO 06/038910 A2 | 4/2006 |

OTHER PUBLICATIONS

International Search Report relating to PCT/US2017/022024, dated May 25, 2017, 11 pages.

\* cited by examiner

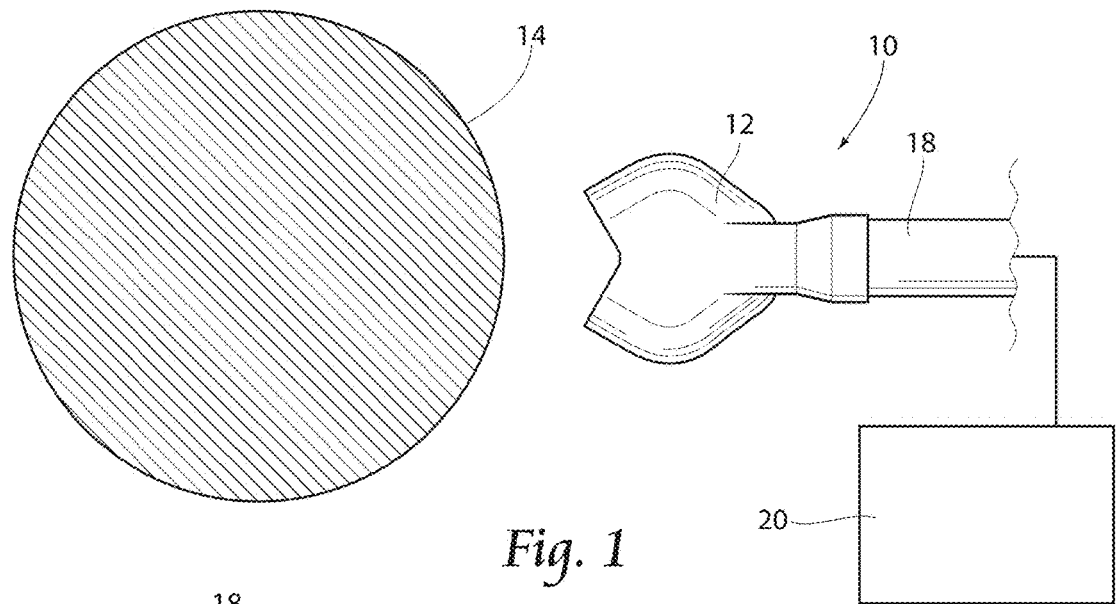
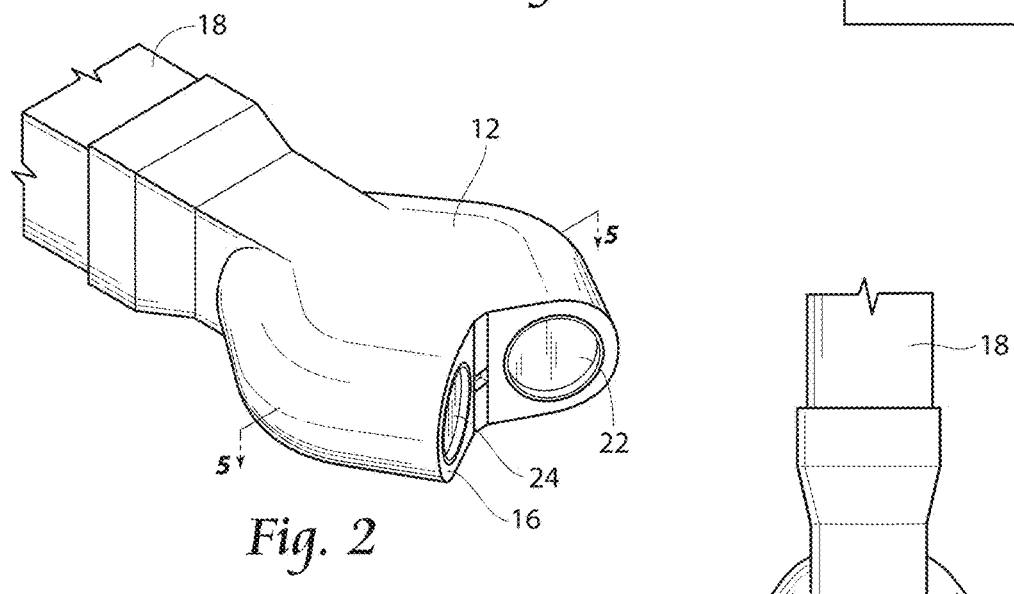
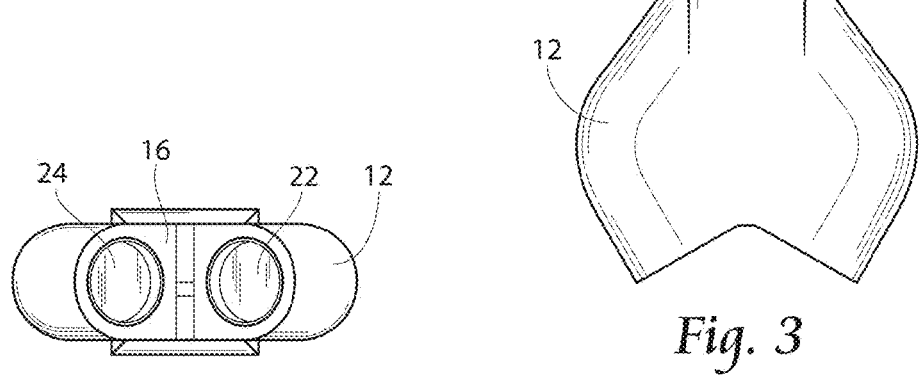

DOPPLER ULTRASONIC VELOCITY PROBE

RELATED APPLICATIONS

This application is a continuation-in-part of co-pending U.S. patent application Ser. No. 14/819,131, filed 5 Aug. 2015.

BACKGROUND OF THE INVENTION

The present invention is directed to vibration monitoring systems, particularly systems for use with large rotating machinery. Known vibration monitoring sensors for large rotating machinery, eddy-current proximity displacement probes and spring-coil velocity transducers, are hampered with intrinsic errors lessening their effectiveness in providing diagnostic warning or data for balancing and accurate rotor deflection monitoring to determine approaching internal contact between rotating and stationary elements thus protecting against rotor damage during start ups. For example, eddy-current proximity displacement probes may suffer from electrical run-out, magnetic run-out, surface irregularity (dents, scratches, grooves) spiking, and ill-defined calibration. Spring-coil velocity transducers suffer poor low speed outputs, mechanical resonance, and difficulty with coupling to a rotating shaft without use of a contacting shaft rider which itself is spiked by surface irregularities. Therefore, there exists a need for a monitoring system having a sensor void of the aforementioned errors to thereby adequately protect and analyze major rotating equipment, such as but not limited to, steam turbines, combustion turbines, generators, fans, compressors and the like.

SUMMARY OF THE INVENTION

The present invention is directed to a system and method for measuring the vibrations of a test object, such as a machine shaft or other rotating equipment, and producing vibration analysis data that, is delivered to a host computer. The system includes a probe sensor fitting having an ultrasonic speaker and an ultrasonic microphone. In use, the ultrasonic speaker transmits an ultrasonic signal toward the test object. The transmitted ultrasonic signal is reflected from the test object, and is detected by the ultrasonic microphone. The signal detected by the microphone is sent to a probe analyzer circuit that processes the signal. A microcomputer within said probe analyzer circuit then performs vibration analysis. The present system uses the reflection of an internally generated, continuous, 25 KHz frequency (ultrasound) incident sound wave to detect the Doppler shift in frequency which is proportional to the target shaft velocity. The current system never disengages from a continuous signal, unlike other designs that routinely pulse a background calibration. Discontinuities in the disengaged signal of other designs can be falsely interpreted as vibration phenomena due to voltage step changes in signal output.

The probe analyzer circuit may include, among others, lowpass filters, scale amplifiers, and a primary component selective Phase Locked Loop Demodulator (PLLD) to eliminate background noise from the signal detected by the ultrasonic microphone. Within the probe analyzer circuit, a microcomputer performs analog to digital conversion of the signal, generates vibration analysis data from the signal, and generates probe health diagnostics of the probe. In addition, the microcomputer preferably contains a serial communications network that is buffered with a transceiver chip and is hard wired by way of an RS-485 connection to an LCCNET proprietary device which provides data polling of a network of probes as a host on a query/response basis. The LCCNET device is then hard wired by way of a RS-232 USB cable to a data display and distribution computer that is equipped with software to provide graphical data displays, diagnostics, alarms, and a preferably an Ethernet link to an external server.

A separate means for vibration analysis is not required since the present system performs all vibration analysis required to detect vibration phenomena, and transmits said vibration analysis to a host computer all in one system. Additionally, by performing the vibration analysis and signal processing within the same system as the probe sensor, any potential for transmission noise is eliminated.

Further, the ultrasonic speaker and ultrasonic microphone are located within a housing at a fixed alignment. The present design preferably positions the ultrasonic microphone in exact coincidence with the opposite direction of the reflected ultrasonic waves, usually employing a fixed 30 degree incidence and 30 degree reflection positioning of the ultrasonic speaker (source) and the ultrasonic microphone (receiver). Preferably, a carrier wave is internally generated from an output capture pin on the microcomputer. The ultrasonic signal is reflected off of a relatively large (approximately 1 inch diameter) surface area of the test object, resulting in a signal that is not disturbed by dents, grooves, or scratches. Since only true total surface velocity is measured and not variable metallurgy or contour of a small area, this system adapts to a broader range of applications than other known vibration monitoring systems. A microphone input filter helps ensure that the Phased Lock Loop Demodulator (PLLD) receives a signal dominated by the reflected wave frequency. In addition, a buffered, zero-phase pulse provides a timing reference for all time-dependent vibration analysis data such as running speed and half running speed.

As will be discussed, a system according to the present invention further preferably includes a temperature and humidly compensation sensor and an extension tube support, with all components positioned at a fixed distance from a target rotating shaft. The temperature and relative humidity sensor detects and signals the system to compensate for variations in the ambient temperature and relative humidity of the test application. The ambient temperature and relative humidity of the application, for example a turbine monitoring atmosphere, affects the speed of sound by up to 25%. Such changes in the speed of sound directly impact the Doppler velocity. The microcomputer receives temperature and humidity senor data through a Serial Peripheral Interface (SPI) port and digitally applies the temperature and relative humidity corrections directly to the analog to digital conversion in software. This arrangement provides for highly accurate gain corrections to the signal from changes in temperature and relative humidity, keeping the sensor system in acceptable calibration at all times. The present design preferably utilizes a 25.000 KHz (+/−200 Hz) incidence wave frequency.

BRIEF DESCRIPTION OF THE DRAWINGS

FIG. 1 is a view illustrating a system according to the present invention, the system including a Doppler vibration velocity sensor, and positioned to measure the vibrations of a test object.

FIG. 2 is a persective view of the sensor illustrated in FIG. 1.

FIG. 3 is a top planar view of the sensor illustrated in FIGS. 1 and 2.

FIG. 4 is an end view of the sensor illustrated in FIGS. 1-3.

DESCRIPTION OF THE PREFERRED EMBODIMENT

Figure 5:
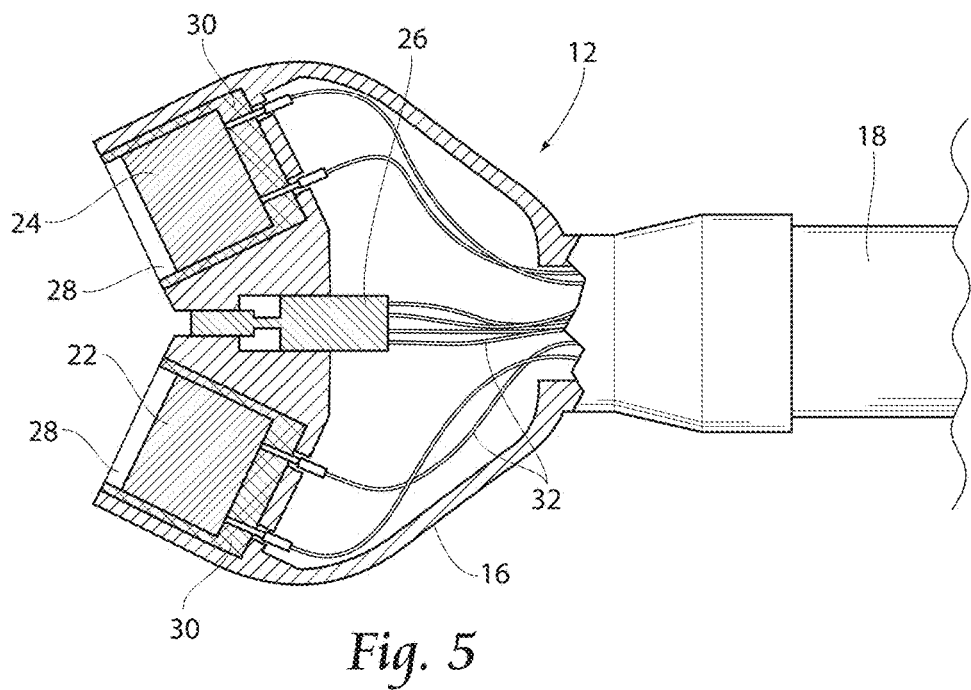
FIG. 5 is a partial cut away and cross sectional view of the sensor illustrated in FIGS. 1-4, taken along lines 5-5 of FIG. 2, and showing an ultrasonic speaker and an ultrasonic microphone.

Although the disclosure hereof is detailed and exact to enable those skilled in the art to practice the invention, the physical embodiments herein disclosed merely exemplify the invention which may be embodied in other specific structures. While the preferred embodiment has been described, the details may be changed without departing from the invention, which is defined by the claims.

With reference to FIGS. 1 and 2, a system 10 having a probe sensor 12 according to the present invention may he seen. As shown, the system 10 provides a device and method adapted to measure the vibrations of a test object 14, such as a machine shaft or other rotating object. The system 10 includes a probe sensor 12 having a housing 16, an extension tube support 18, and a probe analyzer circuit 20. As seen in FIG. 2, a probe sensor 12 for use with the present system. 10 preferably includes an ultrasonic speaker 22 and an ultrasonic microphone 24. The probe sensor 12 may further include a temperature and relative humidity sensor 26, as will be discussed (see FIG. 5). FIGS. 3 and 4 illustrate top and end views, respectively, of the probe sensor 12 shown in FIGS. 1 and 2.

With attention now to the cross sectional view of FIG. 5, the sensor 12 with the ultrasonic speaker 22 and ultrasonic microphone 24 are seen as preferably fitted into a molded housing 16. The housing 16 includes cradle openings 28 and foam isolation jackets 30 to attenuate the incident frequency conduction in the housing 16. An extension tube 18 channels component wiring 32 to a probe analyzer circuit 20 (see FIG. 8), as will be discussed. The extension tube 18 may be of any length necessary for the specific application, and is determined by the particular requirements of the housing 16 and target rotating shaft 14 (see FIG. 6).

As shown, the present system 10 uses a fixed alignment ultrasonic speaker 22 and ultrasonic microphone 24, each placed at a fixed distance D (see FIG. 6) from the test object 14. As mentioned, the sensor 12 preferably includes a temperature and relative humidity sensor 26. The temperature and relative humidity sensor 26 detects and compensates for temperature and relative humidity, since the ambient temperature and relative humidity affects the speed of sound by up to 25% in the application (e.g. turbine monitoring) atmosphere, and changes in the speed of sound directly impact the Doppler velocity.

Figure 6:
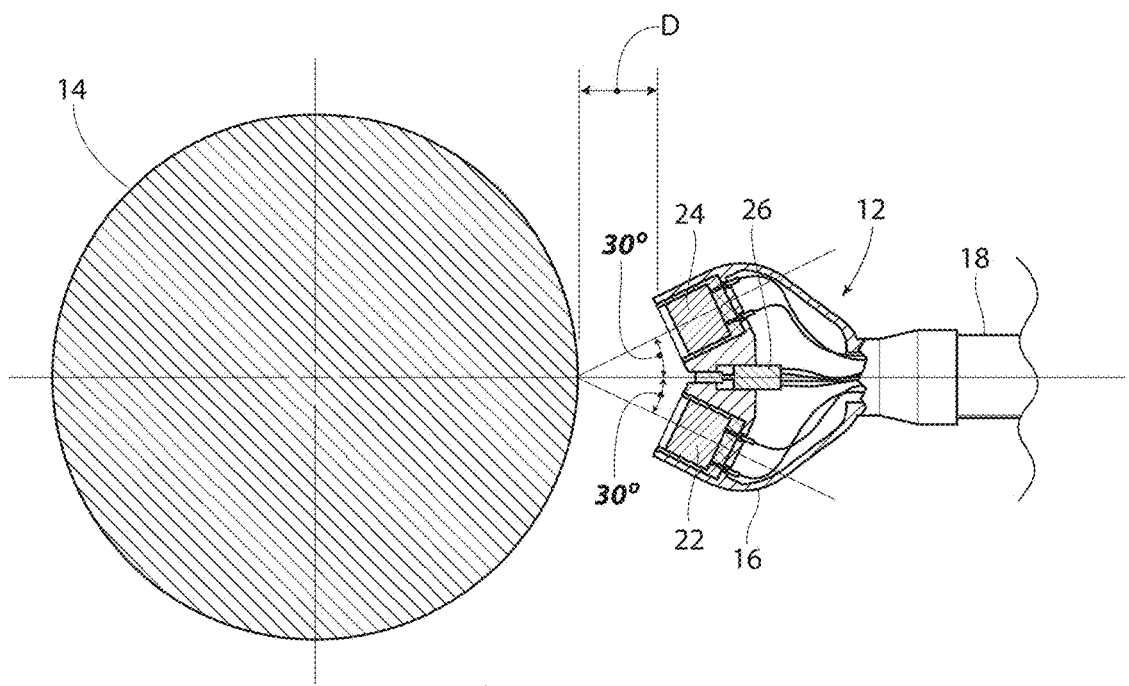
FIG. 6 is a view similar to that of FIG. 5, but showing the sensor positioned to measure the vibrations of a test object.
Figure 7:
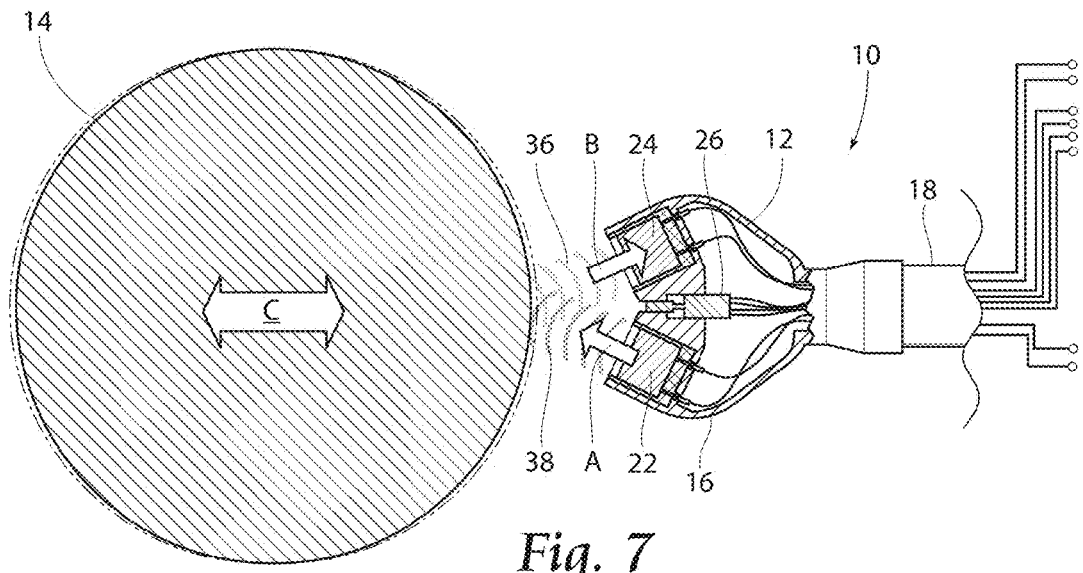
FIG. 7 is a view similar to that of FIG. 6, but showing the sensor measuring the vibrations of a test object.

As seen particularly in FIGS. 6 and 7, the ultrasonic microphone 24 of the present system 10 is preferably positioned in exact coincidence with the opposite direction of the reflected ultrasonic waves 36. As shown in FIG. 6, a preferred position is a fixed 30 degree incidence and 30 degree reflection positioning of the ultrasonic speaker 22 and ultrasonic microphone 24. The probe 12 is further preferably positioned a predetermined distance D, from the target test object 14. An example distance D, may be 1.0" with a +/−0.25 inch tolerance.

Figure 8:
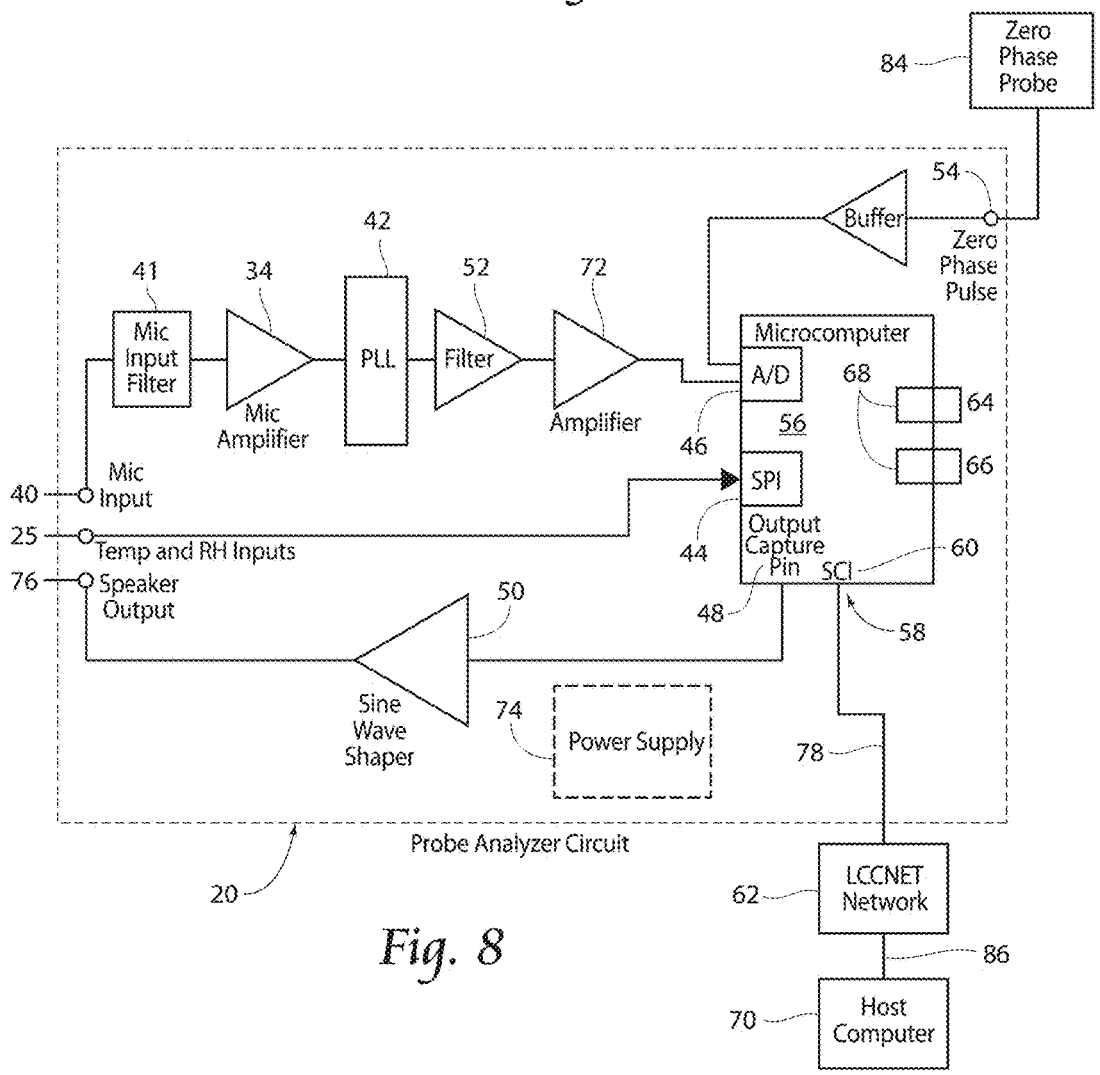
FIG. 8 is a block diagram of a control circuit used with the present invention.

In use, and as shown in FIGS. 7 and 8, the ultrasonic speaker 22 transmits an ultrasonic signal 38, preferably a 25.000 KHz (+/−200 Hz) incidence wave frequency, toward the target object 14 in the direction of arrow A. The ultrasonic carrier signal 38 is internally generated at an adjustable rate from an output rapture pin 48 on the microcomputer 56. The carrier signal generated by the output capture pin 48 is converted to a sine wave by a wave shaper circuit 50 before speaker output 76 transmission through the ultrasonic speaker 22. As previously mentioned, the present system 10 uses the reflection of the continuous 25.000 KHz frequency (ultrasound) incident sound wave to detect the Doppler shift in frequency which is proportional to the target shaft 14 velocity. The transmitted ultrasonic signal 38 is reflected from the test object 14 as reflected waves 36 in the direction of arrow B, and is detected by the ultrasonic microphone 24. Any oscillations or fluctuations C in the rotating shaft 14 will cause variations in the reflected ultrasonic wave 36 at the ultrasonic microphone 24. An output signal from the ultrasonic microphone 24 is then transmitted to a probe analyzer circuit 20 by way of wiring 32 or other conventional means through microphone input 40. The probe analyzer circuit is powered by power supply 74.

As shown in FIG. 8, a microcomputer 56 receives temperature and humidity input corrections 25 via a Serial Peripheral Interface link 44 and digitally, within its code, applies the input corrections 25 directly to the analog to digital signal conversion 46. This retains the sensor system 10 (see FIG. 7) in acceptable calibration at all times. To reduce background noise, the system 10 may preferably include other components as mentioned above, such as microphone input filter 41, microphone amplifier 34, Phase Locked Loop demodulator (PLLD) 42, low-pass filter 52, scale amplifier 72, and mechanical acoustical isolation, such as the jackets 30 shown (see FIG. 5). After the signal is processed through microphone input filter 41, microphone amplifier 34, Phase Locked Loop demodulator 42, low-pass filter 52, and scale amplifier 72, the signal is sent to the microcomputer 56 for analog to digital conversion. The signal enters the analog to digital input 46 as a biased, demodulated, continuous, analog signal. Since the output after signal processing by the Phase. Lock Looped demodulator 42, low pass filter 52, and scale amplifier 72 is in direct proportion to the target shaft velocity, the output represents a real time signal useful for analysis and unburdened by breaks or discontinuities with all gain compensation adjustments affecting only the AC peak-to-peak voltage amplitude and never the primary signal phase nor frequency.

Once the signal has been digitized, the microcomputer 56 performs vibration analysis. Vibration data generated by the microcomputer 56 can include but is not limited to data such as the running speed frequency (Liz), unfiltered velocity (inch/second or micron/second), running speed filtered velocity (inch/second or micron/second), half running speed filtered velocity (inch/second or micron/second), twice running speed frequency filtered velocity (inch/second or micron/second), running speed phase (degrees), running speed filtered displacement (mm or microns), and running speed (revolutions/minute). The microcomputer 56 uses a buffered, zero-phase pulse 54 transmitted from zero phase probe 84 as a once-per-shaft revolution timing signal reference to generate time-dependent vibration analysis data.

Figure 9:
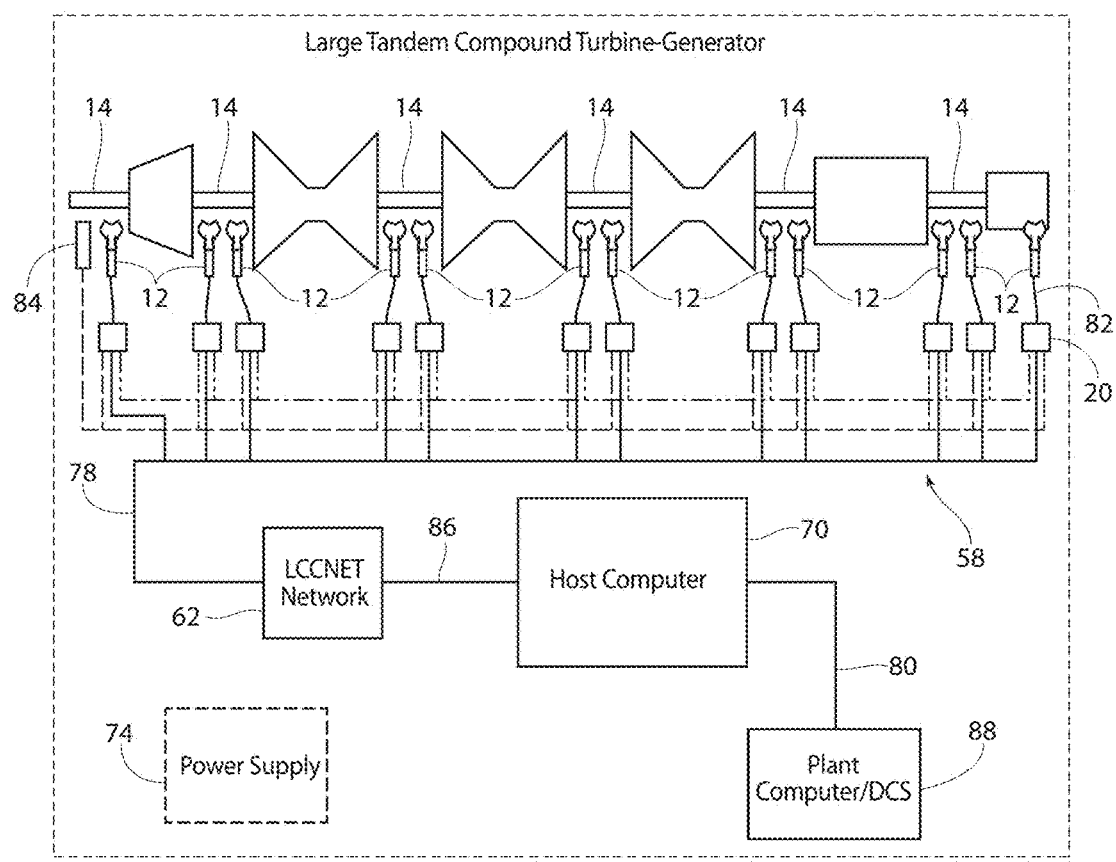
FIG. 9 is a diagram of multiple sensors used in a network for vibration detection.

As best shown in FIGS. 8 and 9, upon query from the LCCNET network protocol device 62, any or all of this vibration data is delivered via a serial communications network 58. The serial communications network 58 includes a serial communications port 60 that is buffered with a transceiver chip that receives queries from the LCCNET network protocol device 62 and transmits the vibration analysis requested to the LCCNET network protocol device 62 by way of an RS-485 connection 78. The LCCNET network protocol device 62 automatically polls the vibration data from each probe sensor 20 in less than 0.0417 seconds, and stacks the vibration data from multiple probe sensors 20 into one message that is provided to the data display and distribution computer 70 at a rate of once/second. The data display and distribution computer 70 is equipped with software to provide graphical data displays, diagnostics, alarms, and an Ethernet link 80 to a plant computer 88.

The microcomputer 56 also generates diagnostic data such as probe signal loss, carrier frequency loss, and demodulator power loss. Said diagnostic data is sent to the data display and distribution computer 70 prior to any vibration data to prevent the data display and distribution computer 70 from interpreting these events as vibration phenomena in the industrial machine being monitored. This prevents false emergency shutdowns of the monitored machine. Said diagnostic data is delivered via the same serial communications network 58 as said vibration data. By utilizing a polled digital serial data stream rather than simply producing a continuous analog output for downstream analysis, the present system prevents the possibility of introducing transmission noise prior to vibration analysis.

As best shown in FIG. 9, multiple probe sensors 12 can be used together in a network to provide vibration analysis at a variety of locations along a large rotating object, such as a large tandem compound turbine-generator. Zero-phase probe 84 provides a timing reference for vibration analysis performed by probe analyzer circuit 20. The wiring connection between the probe sensor 12 and probe analyzer circuit 20 is preferably protected by flexible, armored cable 82 to provide strain relief and adjustable probe sensor 12 placement. The probe analyzer circuit 20 communicates with the LCCNET network protocol device 62 via a RS-485 connection 78, and the LCCNET network protocol device 62 connects to the external data display and distribution computer 70 via a USE, cable 86. The LCCNET network protocol device 62 requests and reads polling data much faster than a typical computer USB port, and so the use of the LCCNET network protocol device 62, which stacks all data into one, once/second message, as an intermediary between probe analyzer circuits 20 and the data display and distribution computer 70, allows on to 32 probes to be used in a single network. Multiple LCCNET host devices may be employed to raise probe counts of a system in quantities of thirty-two each. The high volume of probe sensors and vibration data gives the user an incredibly accurate sampling of vibration phenomena.

As shown in FIG. 8, further configuration can be performed by manually toggling a pair of eight-position Dual in-line Package (DIP) switches 64 and 66 which connect to two eight-bit microcomputer ports 68. DIP switches 64 and 66 provide direct manual configuration of the microcomputer 56 by the user DIP switch 64 provides manual assignment of the engineering units desired for the vibration data output and also provides manual assignment of the direction of shaft rotation. The second DIP switch 66 provides manual input of the serial network drop code, transceiver drop code, and installation phase angle of the Doppler Ultrasonic Velocity Probe to ensure correct data output.

The foregoing is considered as illustrative only of the principles of the invention. Furthermore, since numerous modifications and changes will readily occur to those skilled in the art, it is not desired to limit the invention to the exact construction and operation shown and described. While the preferred embodiment has been described, the details may be changed without departing from the invention, which is defined by the claims.

I claim:

1. A system for measuring vibration velocity of a rotating shaft including:
   a probe sensor for measuring vibrations of said rotating shaft, said probe sensor having a housing, said housing including a first cradle opening and a second cradle opening;
   an ultrasonic speaker, said ultrasonic speaker being positioned in said first cradle opening;
   an ultrasonic microphone, said ultrasonic microphone located within said second cradle opening;
   said probe sensor in communication with a probe analyzer circuit;
   said probe analyzer circuit having a vibration analysis data and a probe health diagnostics data;
   said probe health diagnostics data including at least one of a probe signal loss, a carrier frequency loss and a demodulator power loss;
   said probe analyzer circuit having an zero phase probe; wherein said zero phase probe generates a once-per-shaft revolution timing signal reference;
   said probe sensor having a humidity compensation sensor;
   said probe analyzer circuit having at least one manual switch, where said at least one manual switch, providing for at least one of a manual assignment of a direction of said shaft revolution and a manual input of at least one of a serial network drop code, a transceiver drop code, and an installation phase angle; and
   wherein said probe sensor and said probe analyzer circuit are measuring said vibration velocity of said rotating shaft.

2. The system of claim 1 wherein said probe sensor further includes a temperature sensor.

3. The system of claim 1 wherein at least one of said first cradle opening and said second cradle opening includes an isolation jacket.

4. The system of claim 1 wherein said probe sensor further includes an extension tube support.

5. The system of claim 1 wherein said probe sensor is positionable at a fixed distance from said rotating shaft.

6. The system of claim 1 wherein said ultrasonic speaker is configured to transmit an ultrasonic signal toward said rotating shaft.

7. The system of claim 1 wherein said ultrasonic microphone is configured to receive a reflected ultrasonic signal from said rotating shaft.

8. The system of claim 7 wherein said reflected ultrasonic signal is transmittable to said probe analyzer circuit, said probe analyzer circuit including at least one filter and at least one amplifier.

9. The system of claim 8 wherein said probe analyzer circuit further includes a microcomputer and a primary component selective phase locked loop demodulator.

10. The system of claim 9 wherein said microcomputer is configured to perform vibration analysis and to perform probe health diagnostics.

11. The system of claim 9 wherein said microcomputer includes an analog to digital signal converter.

12. The system of claim 10 herein said microcomputer is configured to transmit said vibration analysis and said probe health diagnostics via a serial communications network.

13. The system of claim 10 wherein an external host computer automatically polls said vibration analysis and said probe health diagnostics.

14. A method for measuring the vibration velocity of a rotating shaft including the steps of:
providing a probe sensor for measuring vibrations of said rotating shaft, said probe sensor having a housing, said housing including a first cradle opening and a second cradle opening;
providing an ultrasonic speaker, said ultrasonic speaker being positioned in said first cradle opening;
providing an ultrasonic microphone, said ultrasonic microphone located within said second cradle opening;
providing a temperature and humidity compensation sensor;
transmitting an ultrasonic signal from said ultrasonic speaker toward said rotating shaft;
reflecting said ultrasonic signal from said rotating shaft as a reflected ultrasonic signal to said ultrasonic microphone;
transmitting said reflected ultrasonic signal to a probe analyzer circuit;
said probe analyzer circuit performing a vibration analysis and a probe health diagnostics;
transmitting said vibration analysis and said probe health diagnostics via a serial communications network, wherein said probe analyzer circuit provides said probe health diagnostics prior to said vibration analysis;
said probe analyzer circuit providing for a zero phase probe; wherein said zero phase probe generating a once-per-shaft revolution timing signal reference;
providing for a manual configuration of a microcomputer, wherein said manual configuration provides for at least one of a manual assignment of a direction of said shaft revolution and manual input of at least one of a serial network drop code, a transceiver drop code, and an installation phase angle; and
wherein said probe sensor and said probe analyzer circuit are measuring said vibration velocity of said rotating shaft.

15. The method of claim 14 further including the steps of:
providing a phase lock loop demodulator; and
processing said reflected ultrasonic signal using said phase lock loop demodulator and said microcomputer.

16. The method of claim 14 further including the steps of:
converting said reflected ultrasonic signal from an analog signal to a digital signal; and
digitally applying corrections from said temperature and humidity compensation sensor to said reflected ultrasonic signal to compensate for a reflected ultrasonic signal gain.

17. The method of claim 14 further including the steps of:
providing at least one filter;
providing at least one amplifier; and
using said at least one filter and said at least one amplifier to process said reflected ultrasonic signal.

18. The method of claim 14 further including the step of providing at least one of said first cradle opening and said second cradle opening with an isolation jacket.

19. The method of claim 14 wherein said probe sensor is positionable at a fixed distance from said rotating shaft.

20. The method of claim 14 wherein an external host computer automatically polls said vibration analysis and said probe health diagnostics.

\* \* \* \* \*

UNITED STATES PATENT AND TRADEMARK OFFICE
CERTIFICATE OF CORRECTION

PATENT NO. : 10,240,972 B2
APPLICATION NO. : 15/247168
DATED : March 26, 2019
INVENTOR(S) : Kim A. Lovejoy Page 1 of 1

It is certified that error appears in the above-identified patent and that said Letters Patent is hereby corrected as shown below:

In the Claims

Column 6, Claim 1, Line 35, "switch, where..." should read --switch, wherein...--

Column 7, Claim 12, Line 4, "...claim 10 herein..." should read --...claim 10 wherein...--

Signed and Sealed this
Sixteenth Day of June, 2020

Andrei Iancu
*Director of the United States Patent and Trademark Office*